Aug. 5, 1969  D. PARKHILL, JR  3,459,445
PIPE FITTING AND METHOD OF MANUFACTURE
Filed Aug. 26, 1965
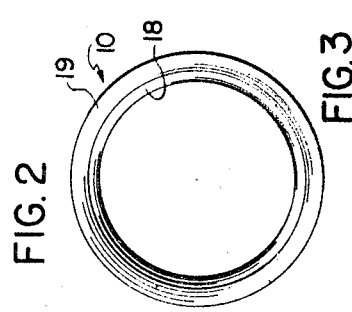
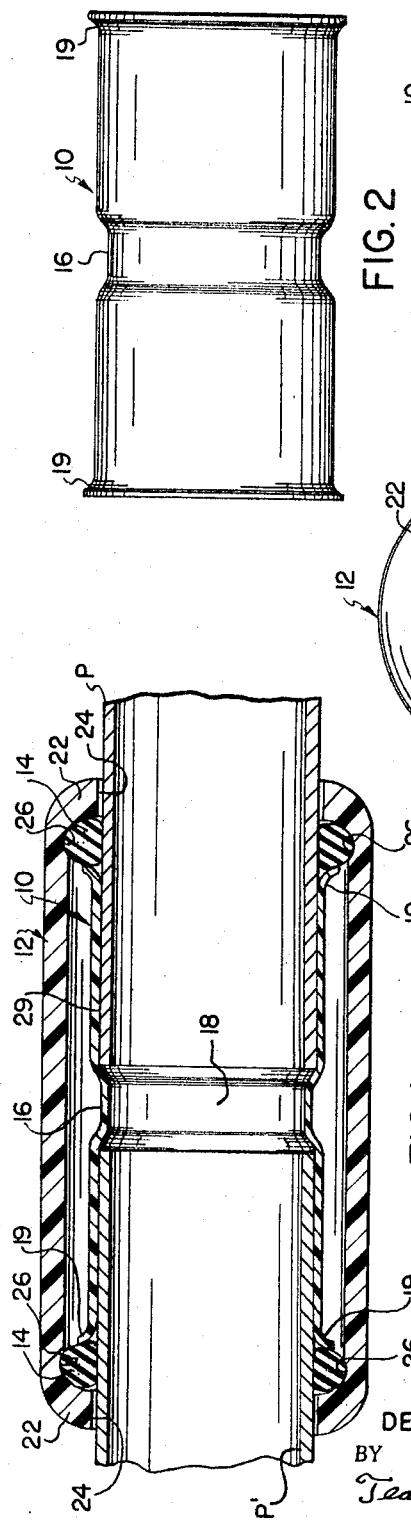
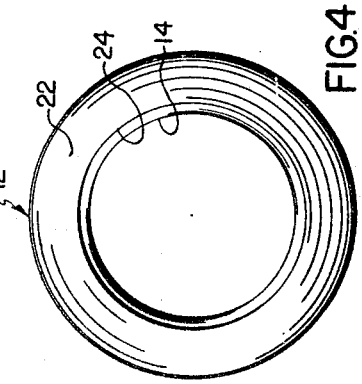
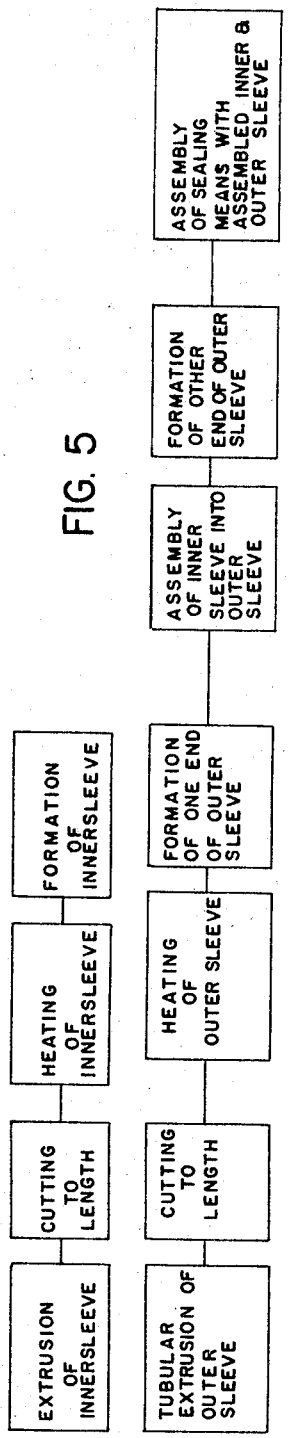
INVENTOR.
DENNIE PARKHILL JR.
BY
Teare, Fetzer & Teare
ATTORNEYS

United States Patent Office 3,459,445
Patented Aug. 5, 1969

3,459,445
PIPE FITTING AND METHOD OF MANUFACTURE
Dennie Parkhill, Jr., Brecksville, Ohio, assignor to Continental Oil Company, Ponca City, Okla., a corporation of Delaware
Filed Aug. 26, 1965, Ser. No. 482,673
Int. Cl. F16l *21/02, 27/12*
U.S. Cl. 285—302          5 Claims

ABSTRACT OF THE DISCLOSURE

A pipe fitting and method for making the same comprising an inner sleeve adapted to receive a pipe therein, an outer sleeve and a sealing member coacting between the inner and outer sleeves for gripping and sealing the pipe with respect to the fitting.

---

This invention relates in general to fittings for coupling tubing or pipe sections together, and more particularly to a fitting which is operable as an expansion joint, for effectively coupling tubing or pipe sections together, while providing for expansion and contraction thereof.

Accordingly, an object of the invention is to provide an improved arrangement of fitting which is operable as an expansion joint for attaching together pipes or tubing or the like.

Another object of the invention is to provide a fitting for pipe or tubing, or the like, which fitting can operate as an expansion joint while coupling the pipe sections together, and wherein the fitting comprises an inner sleeve disposed within an outer sleeve, and resilient means coacting between said sleeves and adapted for sealing, gripping engagement with the pipe.

Another object of the invention is to provide a fitting of the latter mentioned type which is formed of generally rigid plastic material.

A still further object of the invention is to provide a novel fitting for coupling together pipe or tubing wherein the fitting is operable as an expansion joint and comprises an inner sleeve disposed interiorly of an outer sleeve with there being provided sealing means coacting between said sleeves and adapted for sealing, gripping engagement with the aligned pipe or tubing received within the fitting, for coupling the pipe together, and wherein the inner sleeve embodies abutment means thereon for limiting the movement of the pipe inwardly of the fitting.

A still further object of the invention is to provide an extruded plastic fitting for readily coupling conduit or pipe together in aligned relation and which is operable as an expansion joint, and which fitting is relatively economical to manufacture, and which provides for effective coupling of the pipe or tubing sections together, while permitting expansion and contraction movements of such pipe or tubing sections.

Another object of the invention is to provide a novel method of manufacture of the fitting of the invention.

Other objects and advantages of the invention will be apparent from the following description taken in conjunction with the accompanying drawings wherein:

FIG. 1 is a lengthwise sectional view of the fitting of the invention, shown coupling together pipe or tubing sections;

FIG. 2 is a side elevational view of the inner sleeve member of the fitting of FIG. 1;

FIG. 3 is an end elevational view of the inner sleeve member of FIG. 2;

FIG. 4 is an end elevational view of the outer sleeve member of the fitting of FIG. 1, and showing assembled therewith the sealing means which is adapted for coaction between the inner sleeve member and the outer sleeve member and the pipe;

FIG. 5 is a diagrammatic flow sheet of a preferred method of manufacture of the fitting of the invention.

Referring now to FIGS. 1 through 4, the fitting may comprise an inner sleeve member 10 disposed interiorly of an outer sleeve member 12, and with there being provided sealing means 14 in the form of resilient O-rings coacting between the inner and outer sleeve members adjacent opposite ends of the fitting, and which sealing means is adapted for sealing and gripping engagement with the exterior of the associated pipe or tubing section P and P', which when assembled with the fitting, are generally aligned axially with one another.

The inner sleeve member is preferably of relatively thin wall thickness as compared to the wall thickness of the outer sleeve member, and at the central portion thereof may be provided with an annular depression 16 which forms a radial shoulder 18 interiorly of the inner sleeve member, such radial shoulder being adapted to limit the inward movement of the pipe sections P, P' in the assembled condition of the fitting with the pipe. The wall thickness of said inner sleeve may be, for instance, in the order of 0.111 inch. The distal ends of the inner sleeve member are flared outwardly as at 19, as shown, and are adapted for snug abutting engagement with the sealing means 14, to position the sealing means and aid in urging the sealing means into engagement with the outer sleeve 12 and with the pipe. The flared ends 19 of the inner sleeve are adapted to engage the O-rings at a point passing through the approximate center of the cross section of the respective O-ring.

The outer sleeve 12 comprises an elongated tubular or cylindrical-like member with the ends thereof turned inwardly as at 22, and with there being provided axially aligned, preferably circular openings 24 through such ends, for receiving therethrough the piper or tubing P, P'. The wall thickness of such outer sleeve, as aforementioned, is of relatively greater thickness than that of the inner sleeve and, for instance, may be in the order of 0.234 inch, or in other words a little over twice the wall thickness of the inner sleeve. The interior surface of the outer sleeve is preferably provided with axially aligned, circular recesses 26 formed in the wall thereof for providing seats for the sealing means 14, and thus positioning the sealing means with respect to the outer sleeve 12. Recesses 26 are preferably of arcuate configuration in transverse section so as to be formed complementary to the circular O-rings. The interior diameter of each of the openings 24 through the ends of the outer sleeve is preferably just slightly greater than the exterior diameter of the pipe sections P, P', which are received in the fitting (which relationship is slightly exaggerated in FIG. 1 of the drawings) so that there is a sliding fit between the outer sleeve and the pipe.

The interior diameter of the sealing means 14 is preferably slightly less than the exterior diameter of the pipe sctions P, P' which are received in the fitting, and thus such sealing means grips the associated pipe or conduit in frictionally gripping and sealing relationship. Thus while the pipe sections P, P' are adapted for a snug sliding fit with respect to the inner sleeve, the sealing means 14 prevent fluid which is adapted to pass through the axially aligned pipes P, P', from escaping, while still permitting expansion and contraction of the pipes and relative movement of the pipes with respect to the fitting. While both pipe sections in the embodiment illustrated are movable with respect to the fiting, one of the pipe sections (e.g. P) could be permanently fixed to the inner sleeve 10, as for instance by a suitable adhesive applied as at 29 (FIG. 1). The inner and outer sleeves are preferably provided or formed from a relatively rigid plastic material, such as for instance rigid polyvinylchloride, while the sealing means 14 may be formed of any relatively resilient material such as rubber or Neoprene.

A preferred mode of manufacture of the fitting is as follows: The inner sleeve is extruded as a tube utilizing conventional extruding apparatus, and then is cut to the desired length which in the illustration shown would be approximately five and one-quarter inches. Thereafter, one half of the inner sleeve extrusion is heated, for instance by immersing such inner tube section in hot oil, while the section is held in a vertical position. The temperature of the oil should be approximately 300° F. when the sleeve is made of the aforementioned rigid polyvinylchloride plastic. The sleeve is held in the oil a sufficient time to make the material soft and pliable, and in practice this has been found to be between 10 and 15 seconds. The sleeve is then withdrawn and inserted over a die or core, and pressed downwardly onto the die, thus expanding the interior diameter of the respective end of the sleeve section, and forming the aforementioned shoulder 18 therein, while at the same time the die forms the flared end 19. The sleeve section is then inverted and the other end is placed in the hot oil, and then formed on a die in a similar manner as aforedescribed, resulting in the sleeve configuration shown in FIG. 2.

The outer sleeve is extruded utilizing conventional extrusion apparatus, and then is cut to the desired length which in the embodiment illustrated may be approximate- 7 inches. One end of such outer sleeve section is then immersed in the heated oil as was done with the inner sleeve. However, since the wall thickness of the outer sleeve is approximately two times greater than the wall thickness of the inner sleeve it has been found in practice that such outer sleeve should remain immersed in the oil for about 25 seconds in order to adequately soften it and make it moldable. The heated end of the outer sleeve is then placed in a die mold and axial pressure is exerted against the opposite end of the sleeve section to shape the sleeve to the configuration shown in the drawings having the smooth inwardly directed end portion 22 with circular opening 24 therethrough. The inner sleeve is then inserted into the non-formed end of the outer sleeve section and moved inwardly and then the opposite end of the outer sleeve is immersed in the oil and softened, and then formed into the smooth inwardly curved end configuration illustrated, thus positively retaining the inner and outer sleeves together. The circular interior grooves 26 at opposite ends of the outer sleeve may then be cut into such outer sleeve, such as for instance by means of a suitable tool. There is sufficient clearance between the length of the inner sleeve and the interior length of the outer sleeve so that the inner sleeve can be moved sufficiently axially to allow the O-ring grooves 26 to be cut into the outer sleeve while the inner sleeve is positioned therein. The O-ring sealing means 14 are then pressed into place in their receiving grooves 26, and between the inner sleeve and the outer sleeve to form a snug assembly. In use of the fitting, the pipes P, P' can be forced axially through the respective sealing means 14 and into engagement with the shoulder 18.

While the heating of the sleeves has been described as being accomplished by means of hot oil, it will be understood that other heating means could also be utilized, such as infrared heating means or any other suitable heating means.

From the foregoing discussion and accompanying drawings it will be seen that the invention provides a novel fitting for pipe, which may be of generally any type of pipe, including both metallic and plastic pipe, for effectively coupling two pipe sections together in axially aligned relation, and in sealed relation with respect to the fitting. The invention also provides a fitting operable as an expansion joint for enabling expansion and contraction movement of the pipe with respect to the fitting, while maintaining a sealed relation therewith.

I claim:
1. A pipe fitting operable for use as an expansion joint for coupling a pair of tubular sections in end-to-end relation, said fitting comprising a cylindrical, one-piece, inner polymeric sleeve adapted to receive the respective ends of said tubular sections inserted therein, said inner sleeve having an annular depression disposed generally centrally between the opposed ends thereof defining an inwardly directed shoulder adapted to engage the adjacent ends of said tubular sections to limit axial movement of said tubular sections toward one another, the opposed ends of said inner sleeve being flared outwardly and upwardly in a direction away from said tubular sections, a cylindrical, one-piece outer sleeve of polymeric material disposed in encompassing relation around said tubular sections and in radially spaced encompassing relation around said inner sleeve, the opposed ends of said outer sleeve being turned inwardly in a direction toward said tubular sections defining annular openings having a greater diameter than the diameter of said tubular sections to provide a sliding fit thereof with respect to said sections, said outer sleeve having a wall thickness greater than that of said inner sleeve to permit the provision of an annular recess on its interior surface adjacent each of the inturned ends, a resilient sealing ring member seatingly disposed in each of said recesses abutting, sealing and gripping the respective flared ends of said inner sleeve and engaging the exterior surface of the respect tubular sections to prevent the egress of fluid from the interior of said tubular sections, and said sealing ring members having an initial diameter less than the outside diameter of said tubular sections to provide said tight sealing gripping engagement therewith.

2. A pipe fitting in accordance with claim 1, wherein the flared ends of said inner sleeve are disposed to engage the respective sealing ring members at a point of contact generally passing through the approximate transverse cross sectional centers thereof to maintain the sealing ring members in sealing engagement with the inturned ends of said outer sleeve and with said tubular sections in the installed position thereof.

3. A pipe fitting in accordance with claim 1, wherein at least one of said tubular sections is snugly fit for sliding movement with respect to said inner sleeve.

4. A pipe fitting in accordance with claim 3, wherein the exterior surface of one of said tubular sections is adhesively secured to the confronting interior surface of said inner sleeve.

5. A pipe fitting in accordance with claim 1, wherein the wall thickness of said outer sleeve is at least twice as great as the wall thickness of said inner sleeve.

References Cited
UNITED STATES PATENTS

| | | | |
|---|---|---|---|
| 839,750 | 12/1906 | Graham | 285—369 X |
| 3,108,826 | 10/1963 | Black | 285—423 X |
| 1,547,106 | 7/1925 | Dutcher | 285—369 X |
| 1,888,539 | 11/1932 | Otterson | 285—383 X |
| 2,182,797 | 12/1939 | Dillon | 285—383 X |
| 2,653,040 | 9/1953 | Galluppi | 285—369 X |
| 3,265,414 | 8/1966 | Reid et al. | 285—423 X |

FOREIGN PATENTS

| | | |
|---|---|---|
| 1,240,073 | 6/1960 | France. |
| 1,321,532 | 2/1963 | France. |
| 1,386,074 | 12/1964 | France. |
| 814,689 | 9/1951 | Germany. |
| 572,927 | 2/1958 | Italy. |

CARL W. TOMLIN, Primary Examiner

DAVE W. AROLA, Assistant Examiner

U.S. Cl. X.R.

264—234; 285—369, 383, 284, 423